April 15, 1969

F. W. KUETHER ET AL 3,438,253

THERMAL DEVICE FOR MEASURING DIRECTION
AND VELOCITY OF FLUID FLOW

Filed Nov. 15, 1966

INVENTORS.
FREDERICK W. KUETHER
BY ALBERT M. RICHARDS

ATTORNEY.

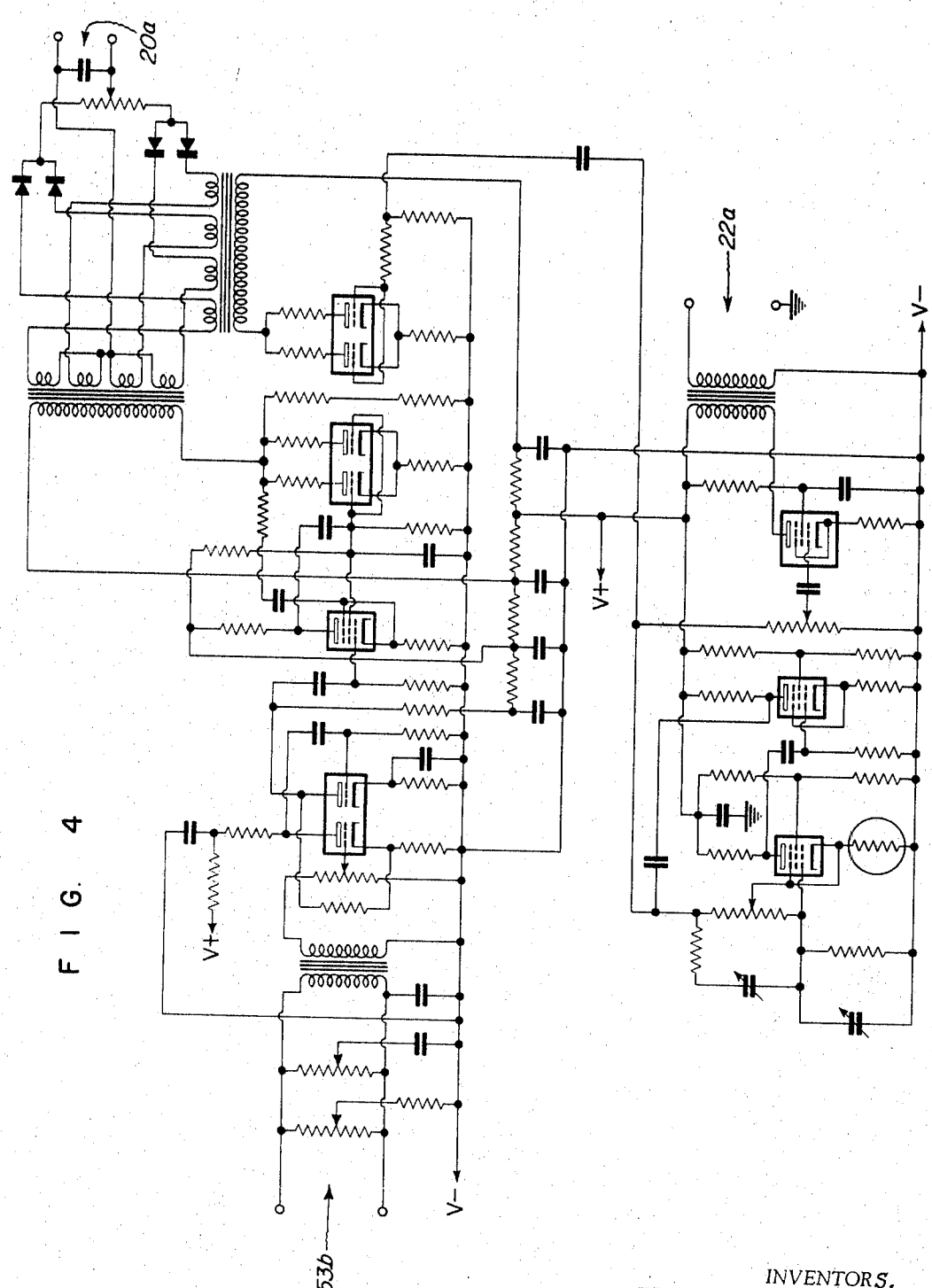

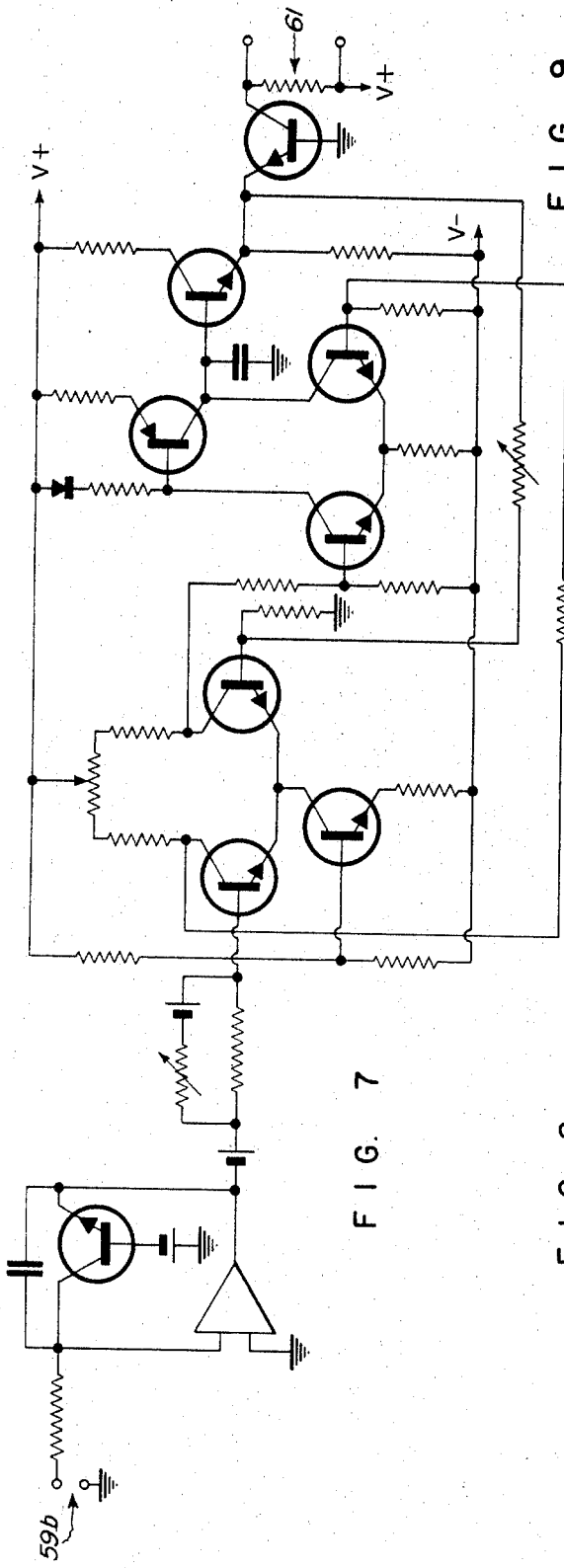
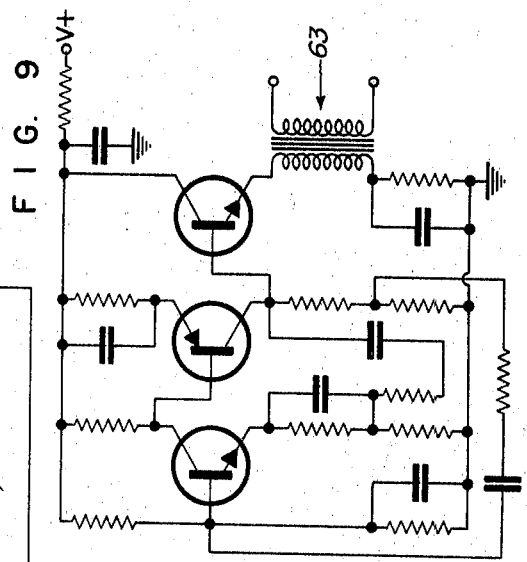
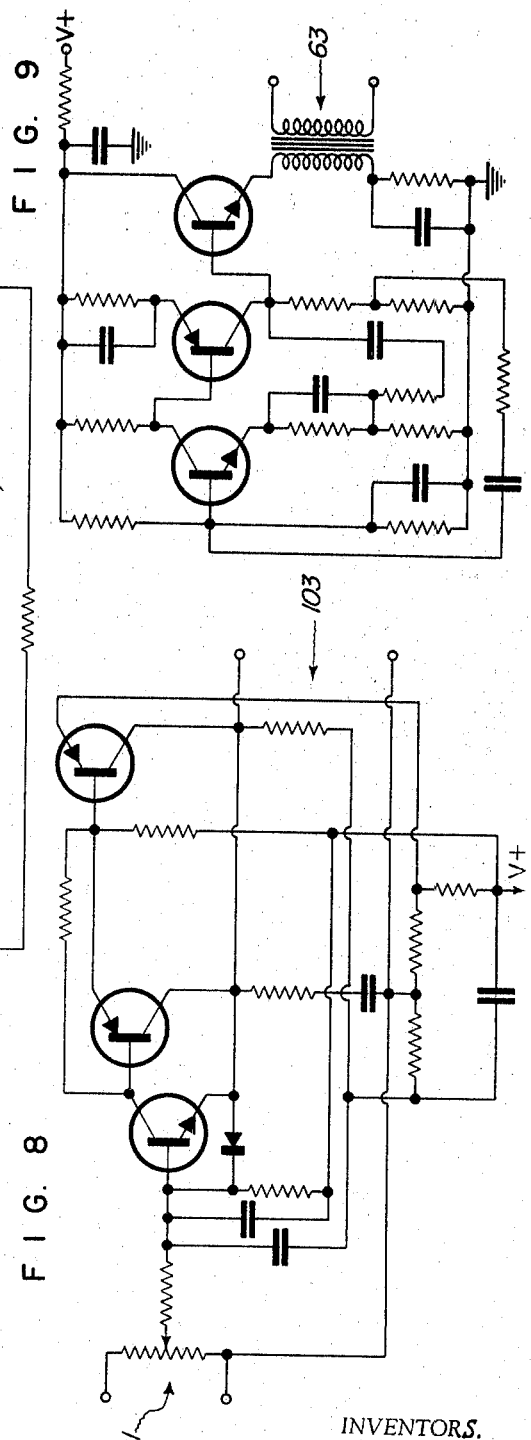
FIG. 7
FIG. 8
FIG. 9
INVENTORS.
FREDERICK W. KUETHER
ALBERT M. RICHARDS
BY Arthur H. Swenson
ATTORNEY.

United States Patent Office 3,438,253
Patented Apr. 15, 1969

3,438,253
THERMAL DEVICE FOR MEASURING DIRECTION AND VELOCITY OF FLUID FLOW
Frederick W. Kuether, Minneapolis, and Albert M. Richards, St. Paul, Minn.; said Kuether assignor of one-half to Honeywell Inc., Minneapolis, Minn., a corporation of Delaware
Filed Nov. 15, 1966, Ser. No. 594,490
Int. Cl. G01f 1/00
U.S. Cl. 73—204     5 Claims

ABSTRACT OF THE DISCLOSURE

A measuring apparatus for sensing the velocity and direction of fluid flowing in a fluid conducting vessel is provided by first and second temperature sensitive elements disposed on a catheter tube. First electronic means are provided to heat and to maintain the first resistance element at a predetermined temperature above ambient fluid temperature, and second electronic means are provided to detect the relative temperature of the second resistance element. Recording means are provided to record the rate at which energy is supplied to the first element, as a measure of the flow velocity, and to record the relative temperature of the second element, as an indication of the flow direction.

---

Figure 10:
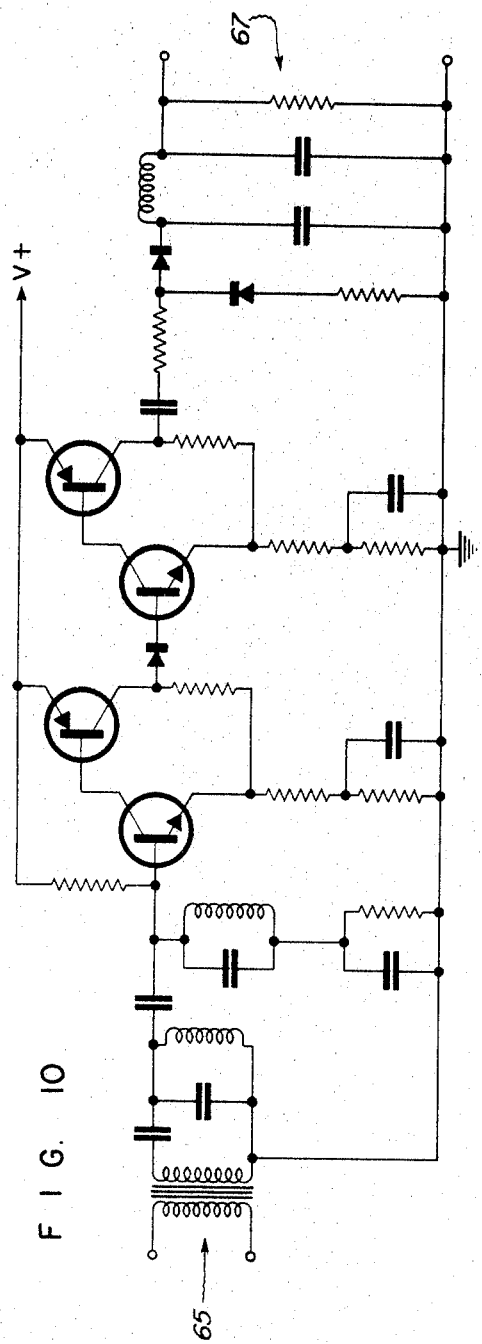

A general object of the present invention is to provide an improved flow sensing apparatus. More particularly, the invention relates to a thermally sensitive flow sensing apparatus for use in sensing the velocity and direction of a fluid flowing in a fluid conducting vessel, the apparatus being characterized by its ability to respond substantially to the instantaneous velocity of pulsatile fluid flow.

Heretofore, thermal sensors have been provided which were suitable for insertion, by means of catheter tubes, into blood conducting vessels of living bodies to measure blood flow. Representative of such prior art was a thermal sensor which included a heater coil and two temperature sensitive electrical resistance coils, all wound on a catheter tube. The heater coil was operated at constant power and was positioned between the two resistance coils. Each resistance coil was connected as a separate branch of the same Wheatstone bridge. As the blood flowed, the upstream resistance coil remained at blood stream temperature while the downstream resistance coil received heat from the constant power heater by forced convection. The resistance coils reversed roles with the reversal of the direction of blood flow. Thus, the changing temperatures of the resistance coils unbalanced the bridge, and the unbalanced bridge voltage resulting, had a magnitude proportional to the blood stream velocity and a polarity indicative of the direction of flow.

Such prior art thermal thermal sensors have been limited in the measurement of instantaneous fluid flow velocity by their relatively slow response time. For example, in the prior art sensor of the type described, a substantial thermal delay is inherent in such a non-isothermal system involving a constant power heater means, since there is a material thermal inertia which limits the rate of response of the temperature sensing elements of the sensing means.

It is accordingly, an object of the present invention to provide an improved thermal flow sensing apparatus for sensing the instantaneous velocity and the direction of fluid flowing in a fluid conducting vessel which sensing apparatus rapidly responds to changes in the velocity of the flowing fluid.

It is another object of the present invention to provide an improved thermal flow sensing apparatus as set forth characterized by its use for sensing the instantaneous velocity and direction of blood flowing in a blood conducting vessel of a living body.

In accomplishing these and other objects, there has been provided, in accordance with the present invention, a thermal sensor having a first and second temperature sensitive resistance element disposed in a longitudinally spaced manner on the outer periphery of a catheter tube. The thermal sensor is inserted by means of a catheter tube into a blood conducting vessel of a living body. To measure the velocity of the flowing blood, the first temperature sensitive element is maintained at a constant temperature higher than the ambient blood temperature. The externally supplied power necessary to compensate for the loss of heat by the first resistance element to the blood will then provide a measurement of the velocity of the flowing blood.

With this isothermal system, the response time of the sensor to changes in the velocity of flow is a function only of the blood-resistance element interface, i.e., a function of how rapidly heat is lost by the element to the surrounding blood. Therefore, since the system is isothermal, there is no objectionable thermal inertia and a significantly faster time of response results. Simultaneously, the direction of the blood flow may be determined by detecting the temperature of the second temperature sensitive resistance element, since the second resistance element will have a higher temperature when downstream with respect to the first element than when upstream.

Figure 1:
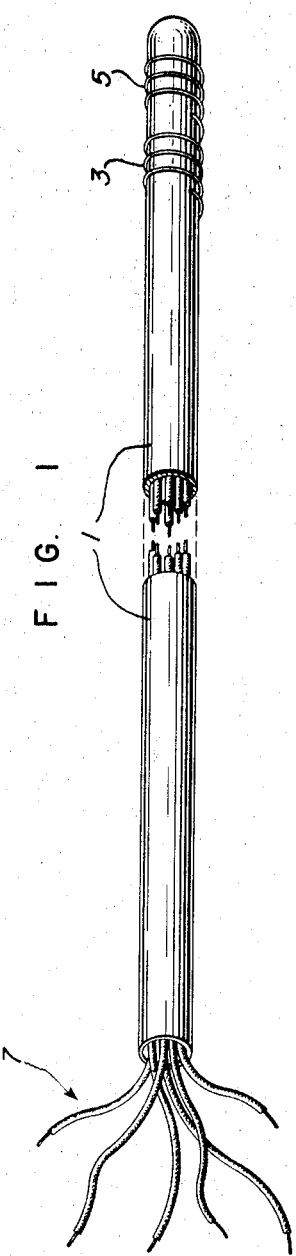
Figure 2:
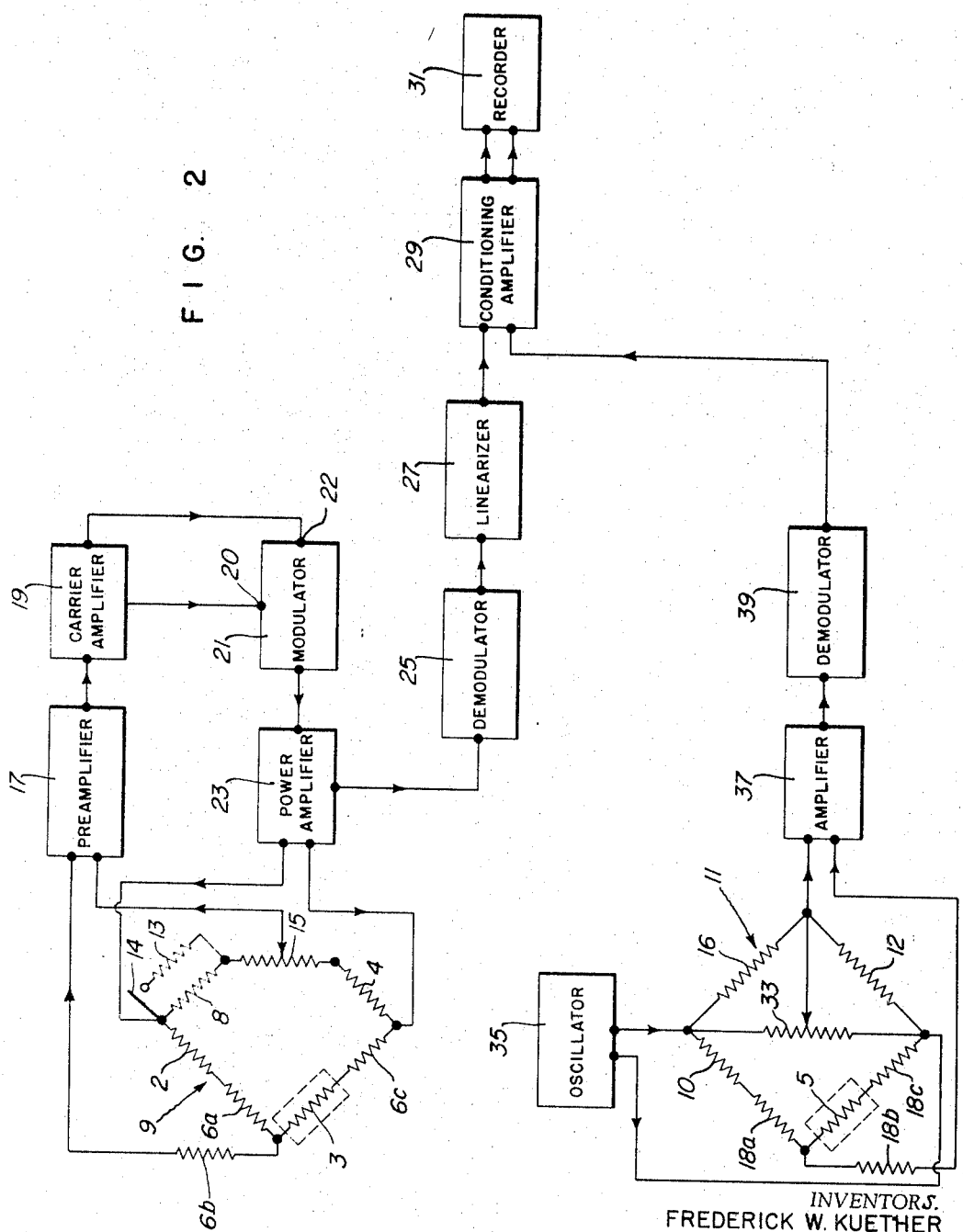
Figure 3:
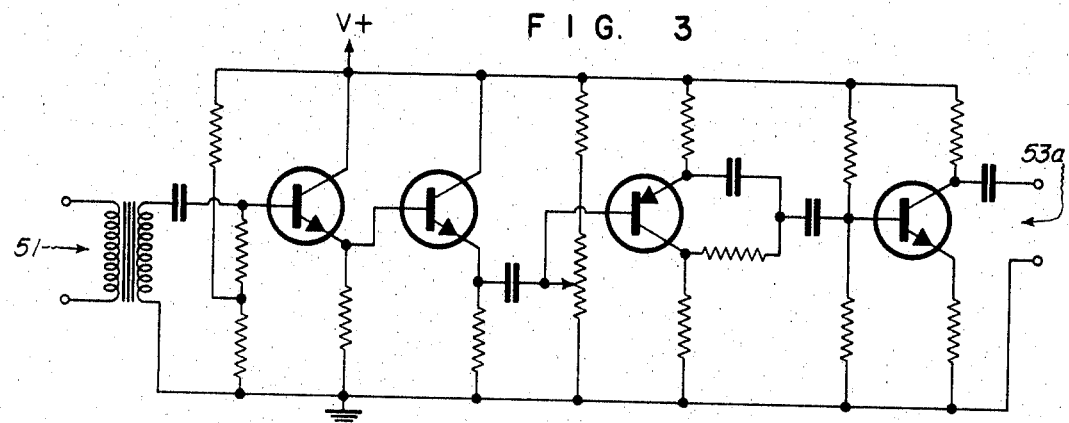
Figure 5:
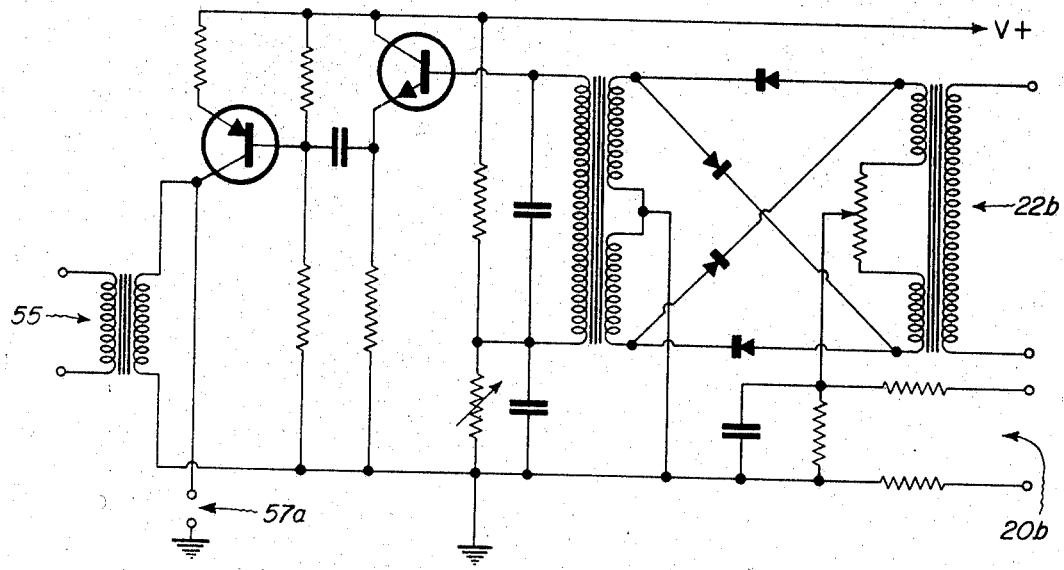
Figure 6:
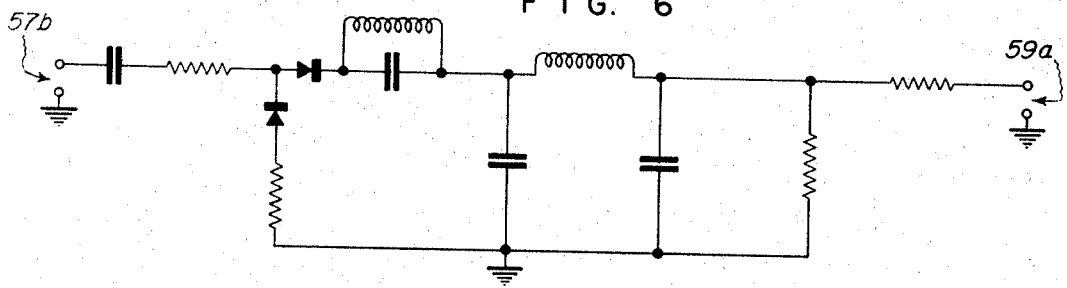

A better understanding of this invention may be had from the following detailed description when read in connection with the accompanying drawings in which:

FIGURE 1 is a pictorial representation of a flow sensor according to the present invention, FIGURE 2 is a schematic diagram of a flow sensing system according to the present invention, FIGURE 3 is a schematic diagram of the preamplifier of FIGURE 2, FIGURE 4 is a schematic diagram of the carrier amplifier of FIGURE 2, FIGURE 5 is a schematic diagram of the modulator and the power amplifier of FIGURE 2, FIGURE 6 is a schematic diagram of the demodulator of FIGURE 2, FIGURE 7 is a schematic diagram of the linearizer of FIGURE 2, FIGURE 8 is a schematic diagram of the conditioning amplifier of FIGURE 2, FIGURE 9 is a schematic diagram of the oscillator of FIGURE 2, FIGURE 10 is a schematic diagram of the amplifier and the second demodulator of FIGURE 2.

Referring to the drawings in more detail, there is shown in FIGURE 1, a catheter tube 1, temperature sensitive resistance elements 3 and 5, and conducting leads 7. In a preferred form of thermal sensing apparatus, constructed in accordance with the present invention, the temperature sensitive resistance elements 3 and 5 were thin film elements made of platinum ribbons 0.00037 centimeters thick, and 0.01 centimeters wide, and were helically wound adjacent the close extremity of the hollow catheter tube 1. A catheter tube with an outer diameter of 0.036 inch of a type well known in the medical art was used. The conducting leads 7 connect the temperature sensitive elements 3 and 5 into associated system electronics as shown in the schematic diagram of FIGURE 2.

The system shown in FIGURE 2 includes a velocity sensor bridge 9. In addition to the temperature sensitive resistance element 3 in one arm thereof, the bridge 9 includes a second arm resistor 2, a third arm resistor 4, and a fourth arm resistor 8. Also shown are internal resistances 6a, 6b, and 6c of the conducting leads 7 which connect the temperature sensitive element 3 into the system electronics. A three lead system is essential for balance since the resistances of the individual conducting leads 7 are significant in comparison to the temperature dependent resistance of the element 3. An offset resistor 13 is connected by switch 14 in shunt with the resistor 8. Further, a zero adjusting potentiometer resistor 15 is connected between the third and fourth arms of the bridge 9. The junction between the first and second arms of the bridge 9 constitutes one of the output terminals of the bridge 9 while the slider of the potentiometer 15 constitutes the other. The other two corners of the bridge 9, i.e. the junction between the first and third arms and the junction between the second and fourth arms constitute the input terminals. The output terminals of the velocity sensor bridge 9 are coupled to the input of a preamplifier 17, the output of which, in turn, is coupled to a carrier amplifier 19. The carrier amplifier 19 provides the A.C. excitation and control of a modulator 21. The output of the modulator 21 is amplified by the power amplifier 23. The power amplifier 23 closes the loop back to the bridge 9 by supplying an A.C. power signal to the input terminals of the bridge 9.

The system shown in FIGURE 2 also includes a direction sensor bridge 11. In addition to the temperature resistance element 5 as one arm thereof, the bridge 11 includes a second arm resistor 10, a third arm resistor 12, and a fourth arm resistor 16. Also shown are internal resistances 18a, 18b, and 18c of the conducting leads 7 which connect the temperature sensitive element 5 into the system electronics. A three lead system is again essential for balance since the resistances of the individual conducting leads 7 are significant in comparison to the temperature dependent resistance of the element 5. The junction between the first and third arms of the bridge 11 constitutes one of its input terminals while the junction between the second and fourth arms constitutes the other. A potentiometer resistor 33 is connected across the input terminals of the bridge 11 and has its slider connected to the junction between the third and fourth arms thereof. The junction between the third and fourth arms and the junction between the first and second arms constitute the output terminals of the bridge 11. The output terminals of the bridge 11 are connected to the input of an amplifier 37; an oscillator 35 provides an A.C. excitation to the bridge 11 input terminals.

In the present invention the temperature sensitive elements 3 and 5 are coupled into the bridges 9 and 11, respectively. However, since the elements 3 and 5 are or may be identical, either may be coupled into one or the other of the two bridges. That is to say, the element 3 may be coupled into the direction sensor bridge 11, in which case the element 5 would be coupled into the velocity sensor bridge 9. While the temperature sensitive elements 3 and 5 are platinum ribbons, in the preferred form of the invention, and are helically wound about the catheter tube 1, semiconductor materials, thermistors, or other devices which exhibit thermally responsive variable electrical conductivity characteristics could also be employed, these devices being disposed on the catheter tube periphery by wrapping, embedding, coating, or other well known methods.

In operation of an apparatus constructed in accordance with the present invention, access to the desired blood conducting vessel of a living body is attained through a prepared opening in the vessel which may be and preferably is remote from the desired measuring location. Through this opening, the catheter tube 1 is inserted and maneuvered in the vessel until the temperature sensitive elements 3 and 5, which are disposed thereon, are positioned in the blood stream at the desired location. This positioning is accomplished by positive control techniques well known to medical science.

With the temperature sensitive elements 3 and 5 positioned in the blood vessel, the velocity sensor bridge 9 is balanced by adjusting the slider of the potentiometer resistor 15. During this balancing, the switch 14 is in its open position and the bridge 9 is balanced with the temperature sensitive element 3 equilibrated to ambient blood temperature. This results in a zero output signal for that condition. Once the bridge 9 is balanced, switch 14 is closed and an unbalanced condition is imposed on bridge 9 since the resistor 13 shunting the resistor 8 causes a lowering of the resistance of the fourth arm of the bridge 9. The resulting unbalance voltage which appears on the output terminal of the bridge 9, as mentioned supra, provides an input signal to the preamplifier 17, which via means of the carrier amplifier 19 and the modulator 21, causes power to be supplied to the bridge 9 by the power amplifier 23, the power thus supplied causes the bridge 9 to rebalance by increasing the temperature of the temperature sensitive resistance element 3. This new balanced condition of the bridge 9 is with the element 3 at a temperature higher than ambient blood temperature.

Due to the physical arrangement of the velocity sensor bridge 9 of FIGURE 2, in which the element 3 is placed in the first arm of the bridge 9, an element with a positive temperature-resistance characteristic must necessarily be used. To compensate for the lowering resistance of the fourth bridge arm, the resistance of the first arm must increase. An element with a negative temperature resistance characteristic could, however, be employed if it were placed in an arm adjacent to the fourth arm of the bridge 9, i.e. in the second and third arms of the bridge 9.

In the new balanced condition of the velocity sensor bridge 9, heat will naturally be lost by the warmer element 3 to the surrounding blood. This will tend to produce an unbalanced condition in the bridge 9. That unbalance condition, in turn, produces a change in the output signal from the bridge 9 which via the preamplifier 17, the carrier amplifier 19, and the modulator 21, effects a change in the output signal of the power amplifier 23. The resultant output signal of the power amplifier 23 is applied to the input terminals of the bridge 9 to compensate for that heat lost to the surrounding blood, tending to maintain the bridge 9 in balance, thereby maintaining element 3 at a predetermined temperature. It is well established that the rate of heat lost by a heated member immersed in a cooler flowing fluid stream is non-linearly proportional to the velocity of the fluid flowing past the member. Therefore, the power supplied by the power amplifier 23 to the bridge 9 to compensate for the loss of heat by the element 3 to the surrounding blood will be non-linearly proportional to the flow velocity of the blood. The power supplied to the bridge 9 is an A.C. signal, and thus, the unbalance of the bridge 9, which is a function of the heat lost by the element 3, will appear on the output terminals of the bridge 9 as an amplitude modulated A.C. signal, i.e. an A.C. signal with an output which has a magnitude proportional to the extent of the unbalance of the bridge 9.

The modulated A.C. signal appearing on the output terminals of the velocity sensor bridge 9 is amplified first by the preamplifier 17 and second by the amplifier section of the carrier amplifier 19. The carrier amplifier 19 includes in addition to the amplifier section, a discriminator and a reference oscillator. The discriminator receives, as its input, the amplified modulated A.C. signal of the unbalanced bridge 9. By comparison of this modulated A.C. input with a signal from the reference oscillator, the discriminator extracts the reference frequency, leaving as the output, a modulation envelope which is an amplified function of the unbalance signal from the bridge 9. The reference oscillator frequency, as will be explained below, is necessarily the same frequency as the A.C. power which is supplied to the bridge 9.

The modulator 21 has two input signals. The first is an excitation signal supplied by the reference oscillator of the carrier amplifier 19. This signal supplies the carrier wave for the modulator 21 and is applied to modulator input terminals 22. The second input signal is the discriminator output signal and is applied to the modulator input terminals 20. This input signal, which is an amplified function of the unbalance signal of the bridge 9, controls the magnitude of the output of the modulator 21 by amplitude modulating the carrier wave supplied by the reference oscillator. The output signal of the modulator 21 is amplified by the power amplifier 23, which in turn, supplies the A.C. power at the reference oscillator frequency to the input terminals of the bridge 9. The power supplied by the power amplifier 23 neutralizes the heat loss of the temperature sensitive element 3. Thus, the power amplifier 23 supplies energy proportional to the output of the modulator 21, the output of the modulator 21, in turn, being a function of the unbalance of the bridge 9. In this manner the system with proper adjustment constantly tends to rebalance the bridge 9, by neutralizing the heat lost by the element 3, and thereby substantially maintains the element 3 at a predetermined temperature.

The FIGURES 3, 4, and 5, respectively, show the schematic diagrams of the preamplifier 17; the carrier amplifier 19; and the modulator 21 and the power amplifier 23; as were used in an apparatus constructed in accordance with the present invention. Referring to FIGURE 3, the preamplifier 17 consists of a two-stage transistor emitter-follower amplifier, capacitively coupled to a phase-shifter stage. The phase-shifter, in turn, drives a voltage amplifier stage. The phase-shifter compensates for accumulated loop phase shift, ensuring that the amplified voltage, resulting from the unbalance of the bridge 9, is compared in phase with the reference oscillator signal in the discriminator section of the carrier amplifier 19. The preamplifier 17 shown in FIGURE 3 receives its input signals from the bridge 9 at terminals 51 and feeds the amplified output therefrom to the output terminals 53a. The carrier amplifier 19, included in the above-referenced constructed apparatus, was a Honeywell Carrier Amplifier, Model No. 130–2C, such as is shown in FIG. 4. The carrier amplifier 19 has input terminals 53b and two sets of output terminals, terminals 20a and 22a. The input terminals 53b are connected to the terminals 53a of the preamplifier 17. The carrier amplifier 19 provides the input signals for the modulator 21. FIGURE 5 shows the modulator 21 with the two sets of input terminals, terminals 20b and 22b, at which the modulator 21 receives the two output signals of the carrier amplifier 19, as hereinbefore described. The power amplifier 23, with its two sets of output terminals, terminals 55 and 57a, is also shown in FIGURE 5. The modulator 21 used in the exemplary apparatus was of the type shown by U.S. Patent 2,820,949, H. C. Hey and drives the power amplifier 23. The power amplifier 23 consists of a transistor emitter-follower stage capacitively coupled to the base of a current amplifier stage. Power is supplied to the bridge 9 through the output terminals 55. The voltage from the output transformer of the power amplifier 23 appears on the second set of output terminals, terminals 57a, and is proportional to the magnitude of the power supplied to the bridge 9.

As explained, the power supplied by the power amplifier 23 to neutralize the heat loss of the element 3 will be non-linearly proportional to the blood flow velocity. To provide a linear measure of the flow velocity which may be displayed, the voltage signal from the power amplifier 23 is coupled, by means of the demodulator 25, the linearizer 27, and the conditioning amplifier 29, to the recorder 31.

More particularly, the demodulator 25 linearly rectifies the voltage signal from the power amplifier 23, extracting therefrom the voltage envelope which is non-linearly proportional to the blood flow velocity. The linearizer 27 then raises this extracted envelope to a mathematical power, making its resulting output a linear function of the flow velocity. The conditioning amplifier 29 conditions, amplifies, and feeds this linearized output signal to the recorder 31. The recorder 31 provides a permanent record which is a linear indication of the instantaneous blood flow velocity. Conditioning, as used herein, refers to that process of taking an input signal and converting it into an output signal, appropriate in form and magnitude, for use as an input to the ultimate output device, e.g. the recorder 31.

Again, referring to the above apparatus constructed in accordance with the present invention, the demodulator 25, the linearizer 27, and the conditioning amplifier 29 used are shown in FIGURES 6, 7, and 8, respectively. The recorder 31 used was a Honeywell Visicorder Galvanometric Recorder. The demodulator 25, as shown in FIGURE 6, consists of a diode in series with a large load resistor and coupled to first and second series connected filter stages. The first filter stage removes ripple due to half-wave rectification and the second eliminates possible pickup from the direction sensor electronics. The demodulator receives its input at the terminals 57b from the power amplifier 23 and has a set of output terminals 59a.

Referring to FIG. 7, the linearizer 27 receives its input at the terminals 59b from the demodulator 25 and has a set of output terminals 61. The linearizer 27 used consists of a logging stage, a voltage adjusting network, an amplifier, and an anti-logging stage. The logging and anti-logging stages may be of the types shown in FIGURES 2.22(a) and 2.22(c), respectively, of the Philbrick Applications Manual bearing the Library of Congress Catalog Card No. 66–19610. The linearizer amplifier consists of two series coupled differential amplifier stages feeding a transistor stage. The transistor stage converts the double-ended differential amplifier outputs into a single ended form and couples the single ended output to a transistor emitter-follower stage. The emitter-follower stage is the output stage and performs the function of reducing the output impedance of the amplifier. The output signal of the emitter-follower stage is also proportionally fed back to the first differential amplifier stage. The conditioning amplifier 29 used in the exemplary apparatus was a Honeywell T6GA, Galvanometer Amplifier, one channel of which is shown in FIGURE 8. The conditioning amplifier 29 has a set of input terminals 101 and a set of output terminals 103. The input terminals 101 receive the signal to be recorded, e.g. the output signals from the terminals 61 of the linearizer 27, and impedance match the output terminals, upon which appear the signal to be recorded, to the input terminals of the recorder 31.

For sensing the direction of blood flow, the direction sensor bridge 11 is intentionally unbalanced a predetermined amount. The unbalance is effected by adjusting the potentiometer resistor 33 with the switch 14 of the bridge 9 in an open position. The switch 14 is opened so that the temperature sensitive element 3 will again equilibriate to ambient blood temperature and thus the resistance of the temperature sensitive element 5 will not be affected by forced heat convection from the element 3. The bridge 11 is unbalanced in the sense that an increase in the temperature of the element 5 will further increase the unbalance. In the apparatus constructed in accordance with the present invention, supra, an element 5 with positive resistance-temperature characteristics was used, although one with negative resistance-temperature characteristics could be used by reversing the direction of the unbalance of the bridge 11.

To sense the direction of flow, the switch 14 of bridge 9 is closed, and thus, the element 3 reassumes its predetermined temperature higher than ambient blood temperature. The direction of flow is now indicated by the magnitude of the unbalance of the bridge 11, since a greater unbalance will result when the temperature sensitive element 5 is downstream with respect to element 3, than when upstream, i.e. element 5 will have a higher temperature as a result of forced heat convection when downstream with respect to element 3 than when upstream.

This unbalance, which appears as a voltage on the output terminals of bridge 11 and which varies in accordance with the change in flow direction, is amplified by the amplifier 37 and then rectified by the demodulator 39. After rectification a D.C. voltage envelope remains which is an amplified function of the unbalance of the bridge 11 and therefore a function of the direction of flow.

The conditioning amplifier 29 conditions, amplifies, and feeds the output signal of the demodulator 39 to the recorder 31. The recorder 31 provides a permanent record which is a function of the output signal of the demodulator 39 and thereby, an indication of the direction of blood flow. By using separate channels in the conditioning amplifier 29 and the recorder 31, respectively, for the velocity and direction signals, indications of instantaneous blood flow velocity and blood flow direction can be recorded simultaneously.

FIGURES 9 and 10, respectively, show the schematic diagrams of the oscillator 35; and the amplifier 37 and the demodulator 39; as were used in the aforementioned apparatus constructed in accordance with the present invention. Referring to FIG. 9, the oscillator 35 excites the bridge 11 by supplying an excitation signal to terminals 63. The terminals 63 are coupled to the input terminals of the bridge 11. Referring to FIG. 10, the signal resulting from the unbalance of the bridge 11 is applied to terminals 65. The terminals 65 act as input terminals for the amplifier 37. The amplifier 37 consists of a two-stage transistor voltage amplifier coupled to a filter network and the filter network limits stray pickup from the velocity sensor electronics. The amplifier 37 feeds the demodulator 39 and the demodulator 39 is a simple half-wave rectifier coupled to a second filter network to remove ripple. The demodulator 39 has output terminals 67 which feed one channel of the conditioning amplifier 29.

Thus, there has been provided an improved thermally responsive flow sensing apparatus for sensing the instantaneous velocity and the direction of fluid flowing in a fluid conducting vessel which rapidly responds to changes in the velocity of the flowing fluid.

The embodiments of the invention in which an exclusive property or privilege is claimed are defined as follows:

1. Apparatus for sensing the velocity and the direction of flow of a fluid flowing in a fluid conducting vessel, said apparatus comprising a hollow tube for insertion in said fluid conducting vessel, said tube having a closed extremity, sensing means disposed on the outer surface of said tube adjacent the closed extremity thereof, said sensing means including a first and a second thin film element exhibiting thermally responsive variable electrical conductivity characteristics, said second thin film element being displaced from said first thin film element longitudinally with respect to the path of the flowing fluid when said tube is inserted in said fluid conducting vessel, first circuit elements which with said first thin film element comprise a first impedance bridge, conductor means connecting said first thin film element in circuit with said first circuit elements, second circuit elements which with said second thin film element comprise a second impedance bridge, conductor means connecting said second thin film element in circuit with said second circuit elements, first amplifying means coupled to said first impedance bridge and including means responsive to unbalance conditions of said first bridge for supplying power to said first thin film element for maintaining said first thin film element at a constant predetermined temperature above the ambient temperature of said flowing fluid, said power supplied to said first thin film element being proportional to the velocity of flow of said fluid, first indicating means responsive to said power supplied for indicating the magnitude of said supplied power, said second thin film element being heated only by the ambient fluid, second amplifying means coupled to said second impedance bridge and including means responsive to unbalance conditions of said second bridge for sensing the magnitude of said second bridge unbalance, said magnitude being indicative of the direction of flow of said fluid, and second indicating means responsive to said magnitude of said second bridge unbalance for indicating said magnitude.

2. The apparatus defined in claim 1 wherein said first and second thin film elements are platinum.

3. The apparatus defined in claim 1 wherein said first and second indicating means, each include a signal amplifying means, and a recording means connected to said signal amplifying means.

4. The apparatus defined in claim 1 wherein said conductor means extend longitudinally and internally along said hollow tube.

5. The apparatus defined in claim 1 wherein said hollow tube is for insertion in said fluid conducting vessel longitudinally with respect to the path of the flowing fluid and said first and second thin film elements are disposed on said tube in a longitudinally spaced relation with respect to the longitudinal dimension of said tube.

References Cited

UNITED STATES PATENTS 3,352,154   11/1967   Djorup _____ 73—204

RICHARD C. QUEISSER, *Primary Examiner.*

EDWARD D. GILHOOLY, *Assistant Examilner.*

U.S. Cl X.R.

128—2.05